(12) United States Patent
Zhang et al.

(10) Patent No.: US 10,809,536 B2
(45) Date of Patent: Oct. 20, 2020

(54) AUGMENTED REALITY GLASSES

(71) Applicant: GoerTek Technology Co., Ltd., Qingdao (CN)

(72) Inventors: Xing Zhang, Qingdao (CN); Xiaocheng Chi, Qingdao (CN); Xiangdong Lan, Qingdao (CN)

(73) Assignee: GoerTek Technology Co., Ltd., Qingdao (CN)

( * ) Notice: Subject to any disclaimer, the term of this patent is extended or adjusted under 35 U.S.C. 154(b) by 217 days.

(21) Appl. No.: 16/030,366

(22) Filed: Jul. 9, 2018

(65) Prior Publication Data

US 2019/0121143 A1  Apr. 25, 2019

Related U.S. Application Data

(63) Continuation of application No. PCT/CN2017/110920, filed on Nov. 14, 2017.

(30) Foreign Application Priority Data

Oct. 19, 2017 (CN) .......................... 2017 1 0979031

(51) Int. Cl.
  *G02C 1/00* (2006.01)
  *G02B 27/01* (2006.01)
  *G02C 9/00* (2006.01)
  *G02C 11/00* (2006.01)

(52) U.S. Cl.
  CPC ........... *G02B 27/0176* (2013.01); *G02C 9/00* (2013.01); *G02B 2027/0159* (2013.01); *G02B 2027/0178* (2013.01); *G02C 11/10* (2013.01)

(58) Field of Classification Search
  CPC .......... G02C 11/10; G02C 7/083; G02C 5/08; G02C 5/22
  USPC ....... 351/158, 41; 345/7, 8, 9; 359/630, 631, 359/638, 618; 349/13
  See application file for complete search history.

(56) References Cited

U.S. PATENT DOCUMENTS

| | | | |
|---|---|---|---|
| 4,198,114 A | 4/1980 | Zapp | |
| 7,631,968 B1 | 12/2009 | Dobson et al. | |
| 7,740,353 B2 * | 6/2010 | Jannard | G02B 27/017 351/158 |

(Continued)

FOREIGN PATENT DOCUMENTS

| | | |
|---|---|---|
| CN | 104914578 A | 9/2015 |
| CN | 205942091 U | 2/2017 |

(Continued)

OTHER PUBLICATIONS

European Patent Office, European Search Report in European Application No. 17885436.0 (dated Dec. 12, 2018).

(Continued)

*Primary Examiner* — Hung X Dang
(74) *Attorney, Agent, or Firm* — Leydig, Voit & Mayer, Ltd.

(57) ABSTRACT

A pair of augmented reality glasses comprising a main body of glasses and an optical assembly connected with the main body of glasses is provided. The optical assembly is arranged on an outer side of the main body of glasses, at least one end of the optical assembly is rotationally connected with a leg of the main body of glasses, and the optical assembly rotates with damping with respect to the leg.

15 Claims, 8 Drawing Sheets

(56) References Cited

U.S. PATENT DOCUMENTS

| | | |
|---|---|---|
| 2013/0176626 A1 | 7/2013 | Heinrich et al. |
| 2015/0009309 A1 | 1/2015 | Heinrich et al. |
| 2015/0261015 A1 | 9/2015 | Han et al. |
| 2016/0033792 A1 | 2/2016 | Blum et al. |

FOREIGN PATENT DOCUMENTS

| | | |
|---|---|---|
| CN | 106687858 A | 5/2017 |
| CN | 206193388 U | 5/2017 |
| CN | 206489327 U | 9/2017 |
| JP | 2002-227824 A | 8/2002 |
| JP | 2003-275022 A | 9/2003 |
| JP | 2007-243649 A | 9/2007 |
| JP | 2010-078726 A | 4/2010 |
| JP | 2010-226680 A | 10/2010 |
| JP | 2012-063638 A | 3/2012 |
| JP | 2013-258477 A | 12/2013 |
| JP | 2017-022668 | 1/2017 |
| JP | 2017-118286 A | 6/2017 |
| WO | WO 96/07947 A1 | 3/1996 |
| WO | WO 2017/004695 A1 | 1/2017 |

OTHER PUBLICATIONS

Written communication in International Application No. PCT/CN2017/110920 (dated May 8, 2018).
Search Report in International Application No. PCT/CN2017/110920 (dated May 8, 2018).
Japan Patent Office, Notice of Reasons for Refusal in Japanese Patent Application No. 2018-536434 (dated Nov. 26, 2019).

\* cited by examiner

US 10,809,536 B2

AUGMENTED REALITY GLASSES

CROSS REFERENCE TO RELATED APPLICATIONS

This application is a continuation under 35 U.S.C. § 111(a) based on International Application No. PCT/CN2017/110920, filed on Nov. 14, 2017, which was published under PCT Article 21(2) and which claims priority to Chinese Patent Application No. 201710979031.X, filed on Oct. 19, 2017. The disclosure of the priority applications are hereby incorporated herein in their entirety by reference.

TECHNICAL FIELD

The present disclosure relates to the technical field of wearable devices, and particularly relates to a pair of augmented reality glasses.

BACKGROUND

With the continuous development of augmented reality technology, augmented reality wearable devices such as augmented reality glasses and other terminal devices are rapidly emerging. In augmented reality glasses, an optical assembly is arranged in front of the user's eyes.

SUMMARY

According to some embodiments of this disclosure, a pair of augmented reality glasses comprises a main body of glasses and an optical assembly connected with the main body of glasses, the optical assembly is arranged on an outer side of the main body of glasses, at least one end of the optical assembly is rotationally connected with a leg of the main body of glasses, and the optical assembly rotates with damping with respect to the leg, wherein the optical assembly is an L-shaped structure comprising a first component and a second component; the first component is connected in a rotational and damped way with the leg, and is arranged along an outer side of the leg; and the second component comprises an optical element which is arranged along a lens adjacent to the leg.

DETAILED DESCRIPTION

In order to make the objectives, technical solutions and advantages of the present disclosure clearer, some embodiments of the present disclosure are further described below with reference to the accompanying drawings.

Figure 1:
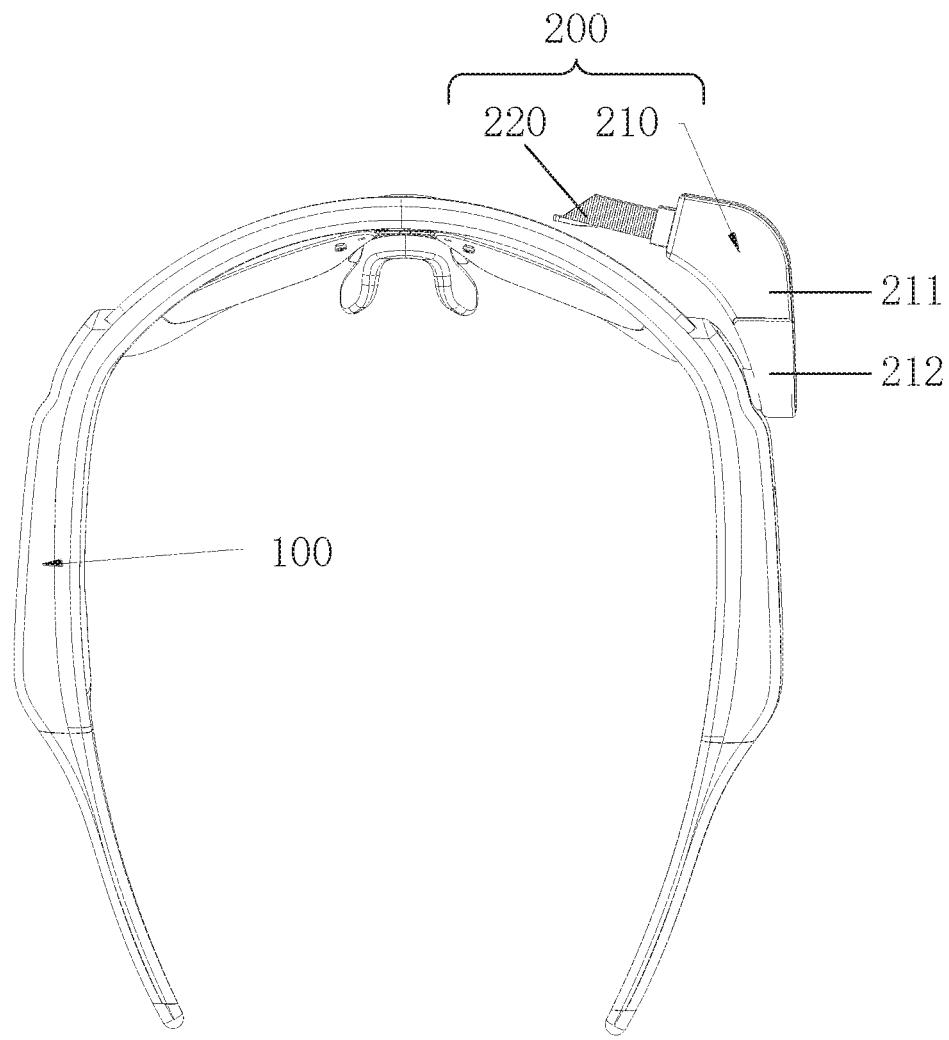
FIG. 1 is a top view of a pair of augmented reality glasses according to some embodiments of the present disclosure.
Figure 2:
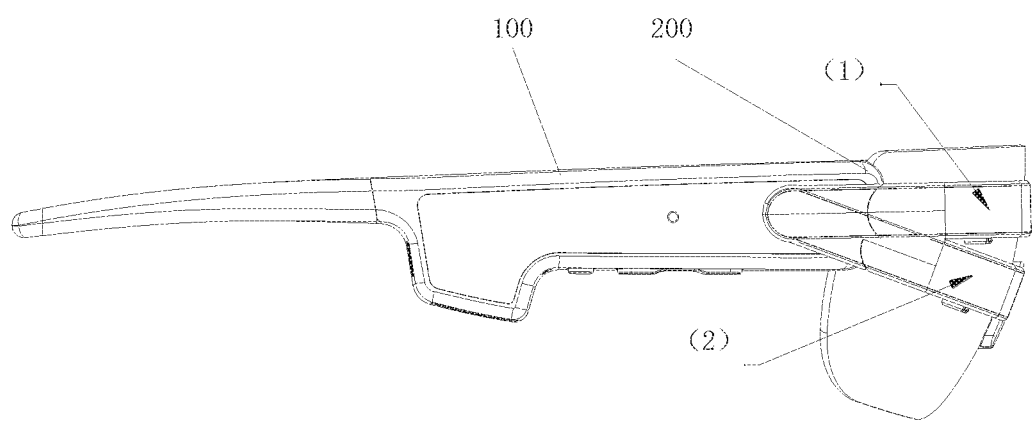
FIG. 2 is a side view of a pair of augmented reality glasses according to some embodiments of the present disclosure.

FIG. 1 is a top view of a pair of augmented reality glasses according to some embodiments of the present disclosure. FIG. 2 is a side view of a pair of augmented reality glasses according to some embodiments of the present disclosure.

The pair of augmented reality glasses, as shown in FIG. 1 and FIG. 2, comprises a main body of glasses 100 and an optical assembly 200. The optical assembly 200 is connected with the main body of glasses 100, and is arranged on an outer side of the main body of glasses 100. The outer side of the main body of glasses 100 is the side of the main body of glasses 100 which is opposite to the head of the user, when the main body of glasses 100 is worn. At least one end of the optical assembly 200 is rotationally connected with either leg of the main body of glasses 100, and the optical assembly 200 rotates with damping with respect to the leg.

As shown in the top view of FIG. 1, an end of the optical assembly 200 is connected with the outer side of the leg of the main body of glasses 100, and the optical assembly 200 can rotate in the direction perpendicular to the plane of the paper. Thereby, when the user wears the pair of augmented reality glasses, the optical assembly 200 can be adjusted up and down in front of the eyes, so that the augmented reality image provided by the optical assembly 200 is matched with the sight line. For example, FIG. 2 is a schematic diagram showing that the optical assembly 200 rotates downward from a position (1) to a position (2).

In some embodiments of the present disclosure, the optical assembly 200 may have more than one end connected with the main body of glasses 100. For example, the optical assembly 200 may have a structure extending across two lenses, and two ends of the optical assembly 200 are connected with two legs respectively.

In some embodiments of the present disclosure, the optical assembly 200 has an L-shaped structure comprising a first component 210 and a second component 220, as shown in FIG. 1. The first component 210 is connected in a rotational and/or damped way with a leg and is arranged along an outer side of the leg. The second component 220 comprises an optical element, and the optical element is arranged along a lens adjacent to the leg. The optical element is used for providing an augmented reality effectiveness to a user, and may comprise optical lenses such as prisms, and may also comprise a transparent or semitransparent display, which is not limited herein.

First Embodiment

Figure 3:
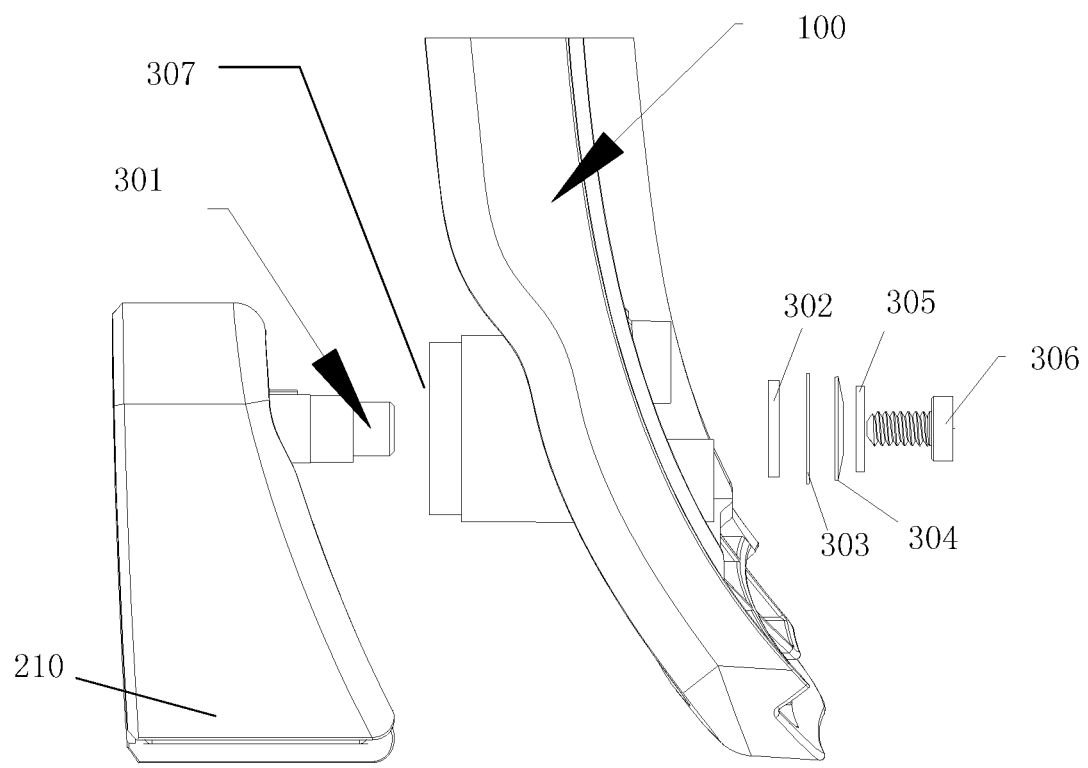
FIG. 3 depicts a structure for connecting an optical assembly and a main body of glasses shown in some embodiments of the present disclosure.

FIG. 3 depicts one structure for connecting an optical assembly and a main body of glasses shown in some embodiments of the present disclosure. As shown in FIG. 3, the first component 210 is connected in a rotational and damped way with a leg through a connecting portion, and the connecting portion comprises a first rotating shaft 301, a first rubber ring 302, a first pressing gasket 303, an anti-loose gasket 304, a second rubber ring 305 and a fastening screw 306.

The first rotating shaft 301 is fixed to an outer side of the first component 210, and a shaft hole 307 is formed at a leg of the main body of glasses 100. The first rotating shaft 301 passes through the shaft hole 307 of the leg, and sequentially passes through the first rubber ring 302, the first pressing gasket 303, the anti-loose gasket 304 and the second rubber ring 305. The fastening screw 306 is screwed into the tail end of the first rotating shaft 301 along its axial direction, and a first rubber ring 302, a first pressing gasket 303, an anti-loose gasket 304 and a second rubber ring 305 are locked. Due to the fastening force provided by the fastening screw 306, a friction force is generated when a component such as the first rotating shaft 301 rotates, thereby producing a damping effect.

The first pressing gasket 303 is a planar metal gasket and is used for providing a sealing effect, and it has a high strength and a long service life. The anti-loose gasket 304 is a metal gasket with a screw thread or a conical surface, and is used for preventing the fastening screw 306 from loosening. The first rubber ring 302 is located between the main body of glasses 100 and the first pressing gasket 303, and the second rubber ring 305 is located between the anti-loose gasket 304 and the fastening screw 306. The first rubber ring 302 and the second rubber ring 305 can provide elasticity, and also can prevent the gasket made of metal from rubbing with the main body of glasses 100 or the fastening screw 306 and generating noise. Thus, silent and rotary tuning may be realized, and the service life of the first rotating shaft 301 is also prolonged.

Second Embodiment

Figure 4:
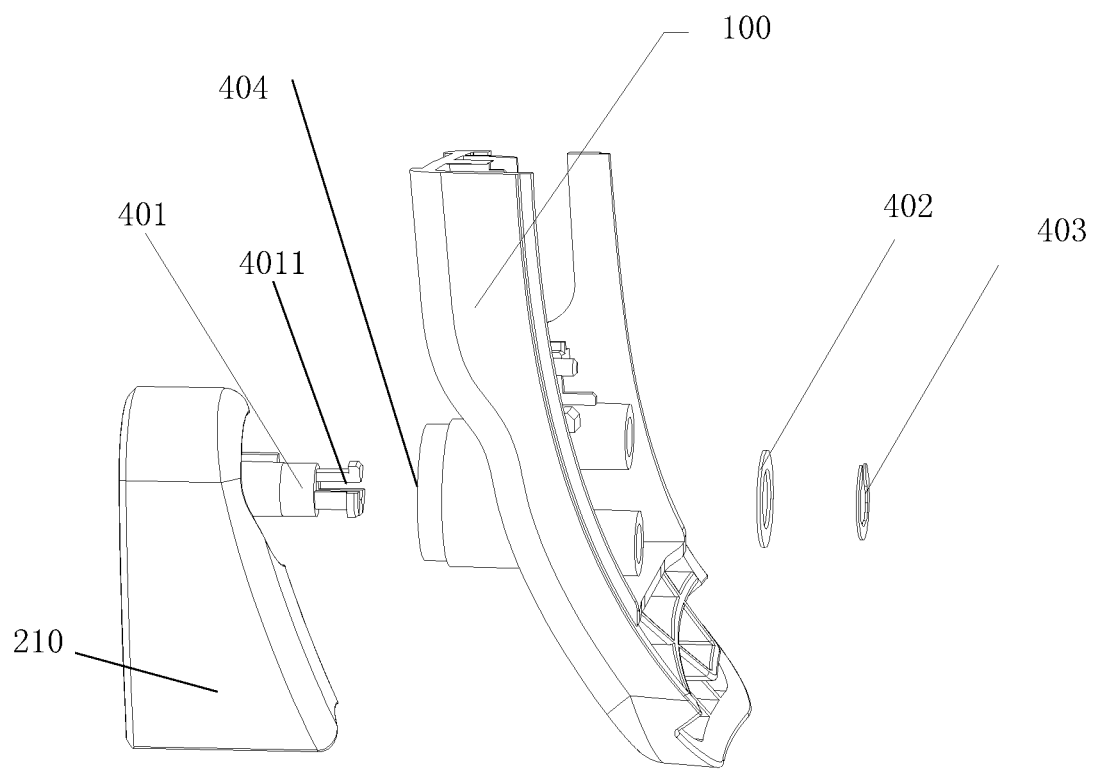
FIG. 4 depicts a structure for connecting the optical assembly and the main body of glasses shown in some embodiments of the present disclosure.

FIG. 4 depicts another structure for connecting the optical assembly and the main body of glasses shown in some embodiments of the present disclosure.

As shown in FIG. 4, the first component 210 is connected in a rotational and damped way with a leg through a connecting portion, and the connecting portion comprises a first rotating shaft 401, a rubber ring 402 and a first butterfly-shaped clamping gasket 403. The first rotating shaft 401 is fixed to an outer side of the first component 210. A shaft hole 404 is formed in a leg. The first rotating shaft 401 passes through the shaft hole 404 and sequentially passes through the rubber ring 402 and the first butterfly-shaped clamping gasket 403. A first clamping buckle 4011 is arranged at the tail end of the first rotating shaft 401. The first butterfly-shaped clamping gasket 403 clamps the first clamping buckle 4011, and locks the rubber ring 402.

In some embodiments, the optical assembly 200 is rotationally connected with the leg of the main body of glasses 100 through a first rotating shaft 401. Due to the existence of the rubber ring 402, a damping rotation is formed between the optical assembly 200 and the leg under the action of the elasticity and the friction force of the rubber ring 402, and the hand feeling of the rotary adjustment is comfortable. By means of the damping force, the optical assembly 200 can stop at any position when being rotated to adapt to the eye positions of different users, and provide a good augmented reality experience.

Third Embodiment

Figure 5:
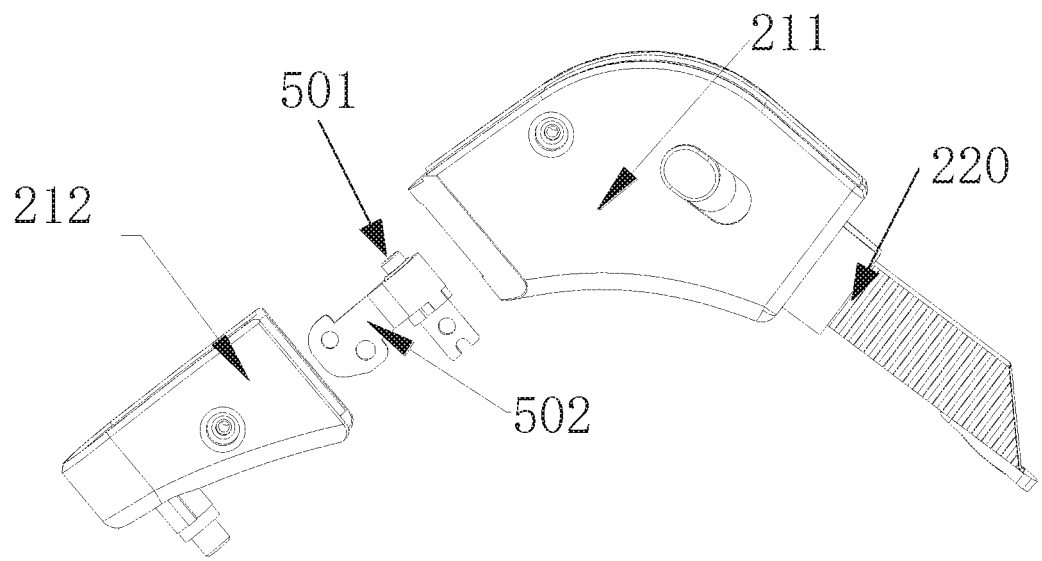
FIG. 5 depicts a structure for connecting a front section and a rear section of the optical assembly shown in some embodiments of the present disclosure.
Figure 6:
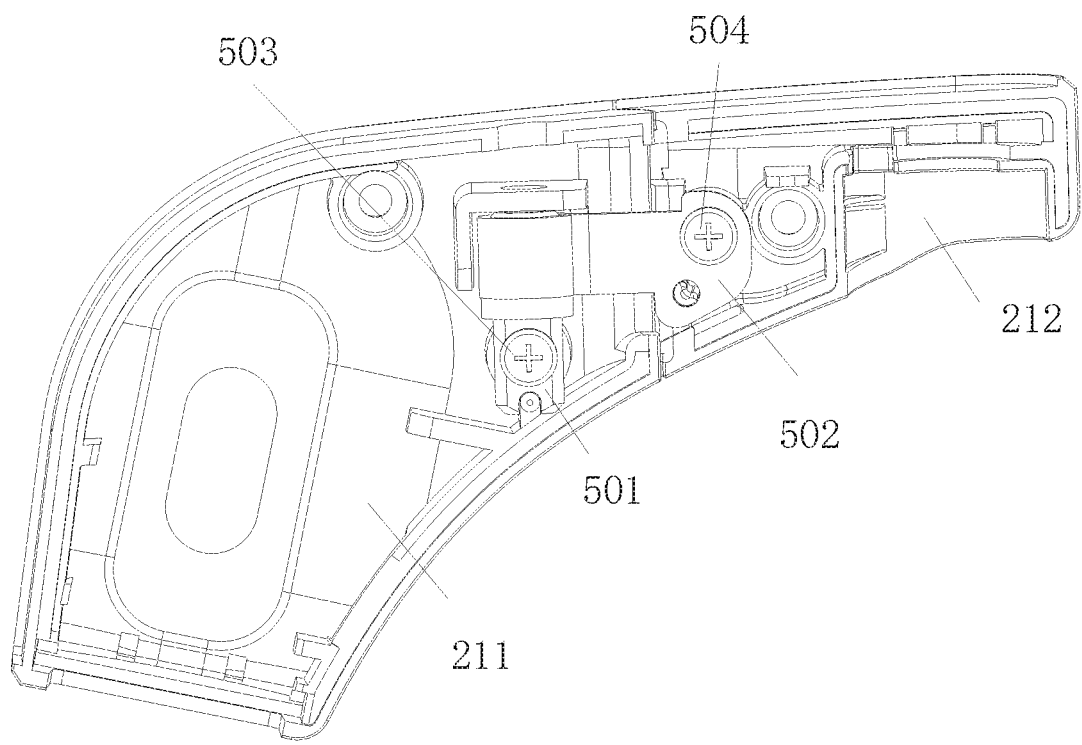
FIG. 6 is a cross-sectional view of the optical assembly shown in FIG. 5.

FIG. 5 depicts a first structure for connecting a front section and a rear section of the optical assembly shown in some embodiments of the present disclosure. FIG. 6 is a cross-sectional view of the optical assembly shown in FIG. 5.

As shown in FIG. 5, the first component 210 further comprises a rotating portion, and the rotating portion divides the first component 210 into a front section 211 and a rear section 212 (see FIG. 1). The front section 211 is connected with the second component 220, and the rear section 212 is connected in a rotational and damped way with an outer sidewall of a leg. The front section 211 and the rear section 212 are connected in a rotational and damped way through the rotating portion.

As shown in FIG. 5 and FIG. 6, the rotating portion between the front section 211 and the rear section 212 comprises a second rotating shaft 501 and a rotating connecting member 502. The second rotating shaft 501 is fixed on the front section 211. The rotating connecting member 502 sleeves on the second rotating shaft 501, and engages with the second rotating shaft 501 with an interference fit. A tail end of the rotating connecting member 502 is fixedly connected with the rear section 212. A limiting structure is arranged between the second rotating shaft 501 and the rotating connecting member 502. The limiting structure restricts the rotating connecting member 502 to rotate around the second rotating shaft 501 in a predetermined range.

In some embodiments of the present disclosure, the rotating connecting member 502 can be formed by sheet metal manufacturing process or metal injection forming process. The rotating connecting member 502 and the second rotating shaft 501 engage with an interference fit to produce a damping effect. The second rotating shaft 501 is tightly locked on the front section 211 through a screw 503. The rotating connecting member 502 is tightly locked on the rear section 212 through a screw 504.

In some embodiments of the present disclosure, the limiting structure provided between the second rotating shaft 501 and the rotating connecting member 502 can be realized by a shaft shoulder on the second rotating shaft 501.

Fourth Embodiment

Figure 7:
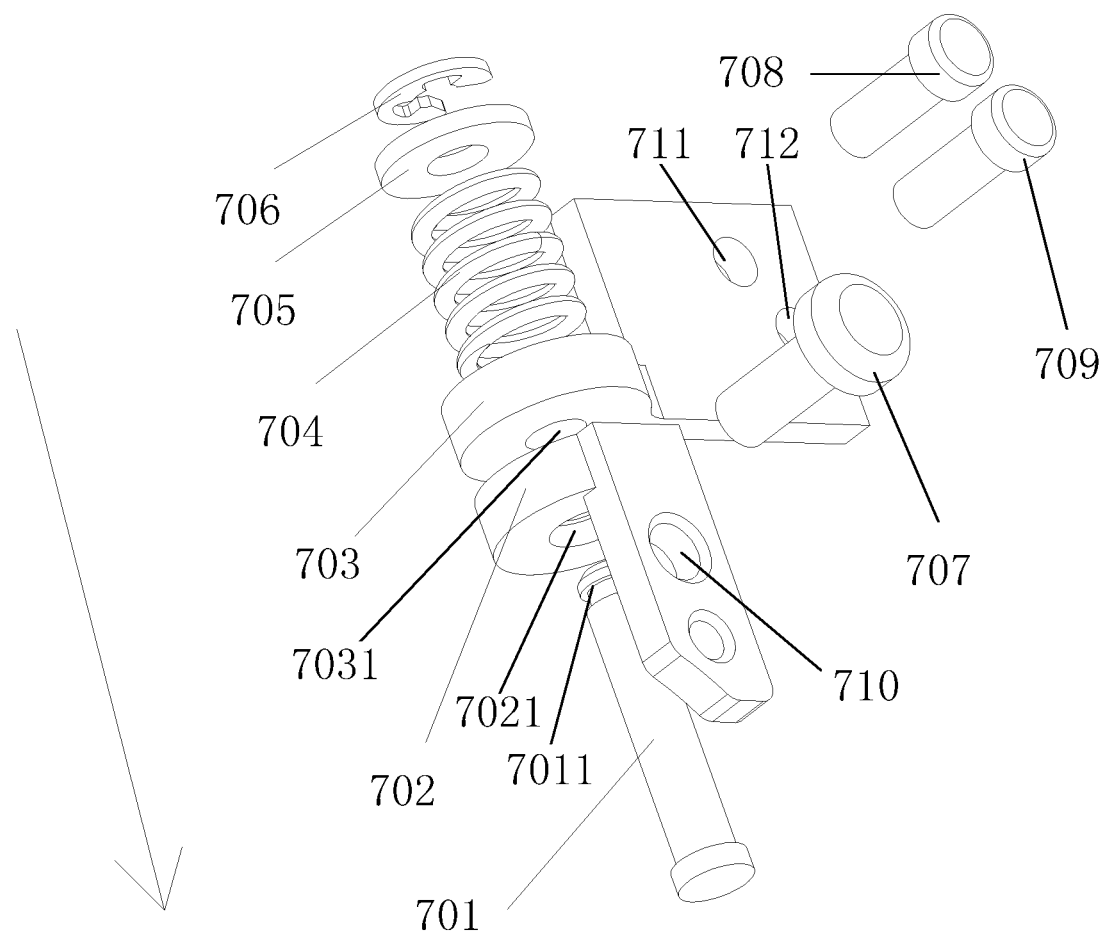
FIG. 7 depicts a structure for connecting a front section and a rear section of an optical assembly shown in some embodiments of the present disclosure.
Figure 8:
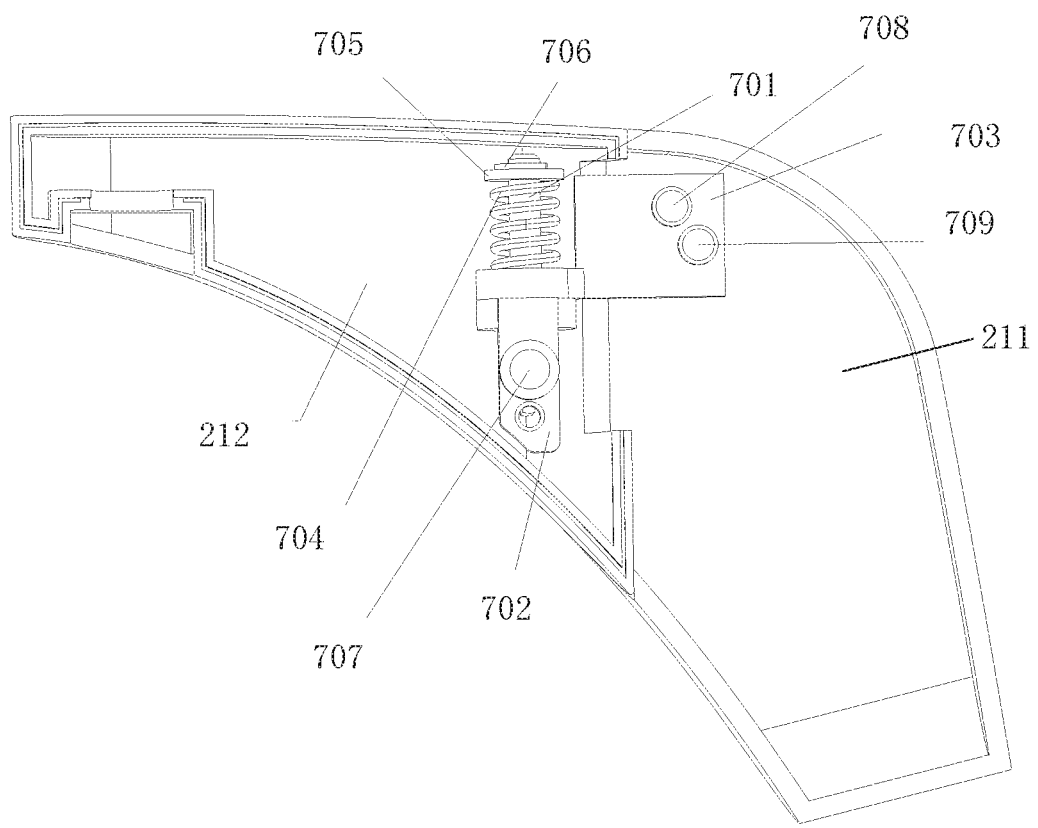
FIG. 8 is a cross-sectional view of the optical assembly shown in FIG. 7.

FIG. 7 depicts a second structure for connecting a front section and a rear section of an optical assembly shown in some embodiments of the present disclosure. FIG. 8 is a cross-sectional view of the optical assembly shown in FIG. 7.

As shown in FIG. 7 and FIG. 8, the rotating portion between the front section 211 and the rear section 212 of the optical assembly 200 comprises: a second rotating shaft 701, a first rotating shaft component 702, a second rotating shaft component 703, a spring 704, a second pressing gasket 705 and a second butterfly-shaped clamping gasket 706. The first rotating shaft component 702 and the second rotating shaft component 703 are fixed on the rear section 212 and the front section 211 respectively. The first rotating shaft component 702 and the second rotating shaft component 703 are both provided with a shaft hole, wherein the shaft hole of the first rotating shaft component 702 is marked as 7021 and the shaft hole of the second rotating shaft component 703 is marked as 7031. The second rotating shaft 701 passes through the shaft hole 7021 of the first rotating shaft component 702 and the shaft hole 7031 of the second rotating shaft component 703, and sequentially passes through the spring 704, the second pressing gasket 705 and the second butterfly-shaped clamping gasket 706. A second clamping buckle 7011 is arranged at a tail end of the rotating shaft 701. The second butterfly-shaped clamping gasket 706 tightly clamps the second clamping buckle 7011, so as to fasten the first rotating shaft component 702, the second rotating shaft component 703, the spring 704 and the second pressing gasket 705. The contacting surface between the first rotating shaft component 702 and the second rotating shaft component 703 forms a damping friction surface.

Threaded holes are formed in the first rotating shaft component 702 and the second rotating shaft component 703. The first rotating shaft component 702 is fixed on the rear section 212 through a screw 707 passing through the threaded hole. The second rotating shaft component 703 is fixed on the front section 211 through the screw 708 and the screw 709. The second rotating shaft 701 sequentially passes through the shaft hole of the first rotating shaft component 702, the shaft hole of the second rotating shaft component 703, the spring 704 and the second pressing gasket 705. The second clamping buckle 7011 at the end of the second rotating shaft 701 and the second butterfly-shaped clamping gasket 706 are clamped together and locked tightly. Under the action of the elastic force of the spring 704, the first rotating shaft component 702 and the second rotating shaft component 703 are pressed together. During rotation adjustment, a damping effect is achieved by the frictional resistance between the first rotating shaft component 702 and the second rotating shaft component 703.

Fifth Embodiment

Figure 9:
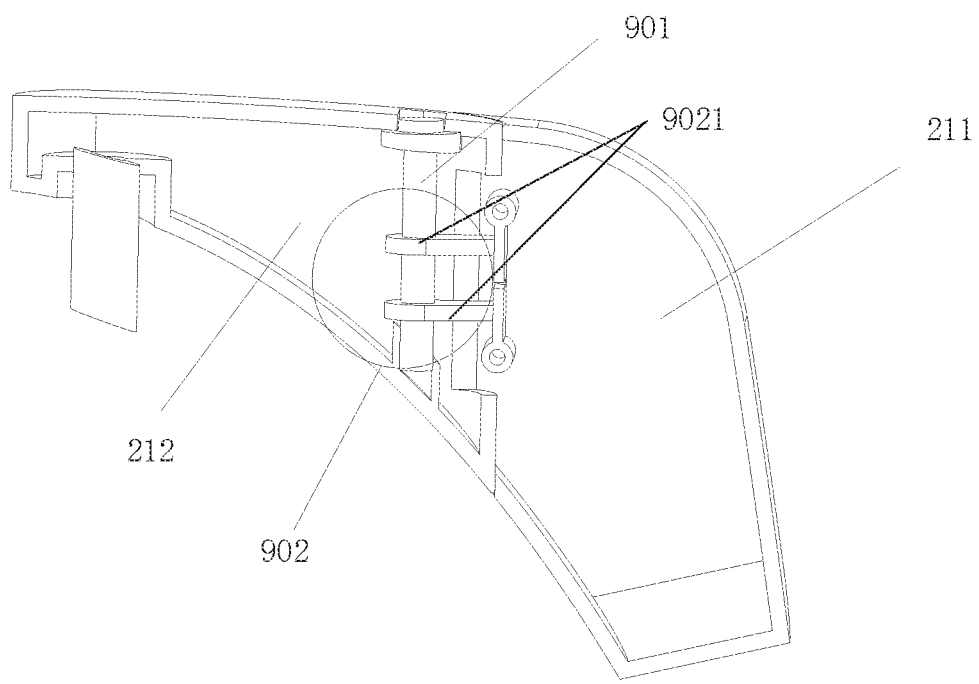
FIG. 9 depicts a structure for connecting a front section and a rear section of an optical assembly shown in some embodiments of the present disclosure.

FIG. 9 depicts a third structure for connecting a front section and a rear section of an optical assembly shown in some embodiments of the present disclosure.

As shown in FIG. 9, the rotating portion between the front section 211 and the rear section 212 comprises a second rotating shaft 901 and a clamping structure 902. The second rotating shaft 901 is fixed on the rear section 212. The clamping structure 902 is fixed on the front section 211, and comprises a plurality of clamping claws 9021. In the embodiment shown in FIG. 9, the number of the clamping claws 9021 is two, but the number of the clamping claws 9021 is not limited thereto, and more clamping claws 9021 may be provided to increase the tightness of the clamping. The plurality of clamping claws 9021 all clamp the second rotating shaft 901, and engage with the second rotating shaft 901 with an interference fit. The second rotating shaft 901 and/or the clamping claws 9021 are made of a self-lubricating material.

The clamping structure 902 and the rotating shaft 901 are assembled in a clamped manner, so the operation is convenient and simple. In addition, at least one of the second rotating shaft 901 and the clamping claws 9021 are made of a self-lubricating material, so the damping rotation adjustment can be smoother, and the hand feeling in operation is comfortable.

By designing the first component 210 of the optical assembly 200 as a sectional structure and taking advantage of the relative rotation between the front section 211 and the rear section 212, the adjustable range of the augmented reality image can be further enlarged.

Figure 10:
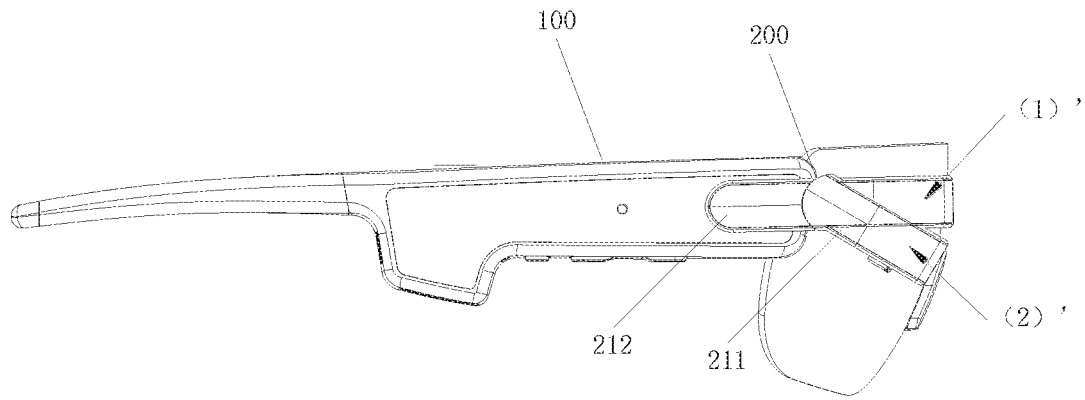
FIG. 10 is another side view of a pair of augmented reality glasses according to some embodiments of the present disclosure.

FIG. 10 is another side view of a pair of augmented reality glasses according to the present disclosure. The side view shows a schematic diagram when the front section 211 is rotated downward with respect to the rear section 212, and the position is adjusted from the position (1)' to the position (2)'.

Figure 11:
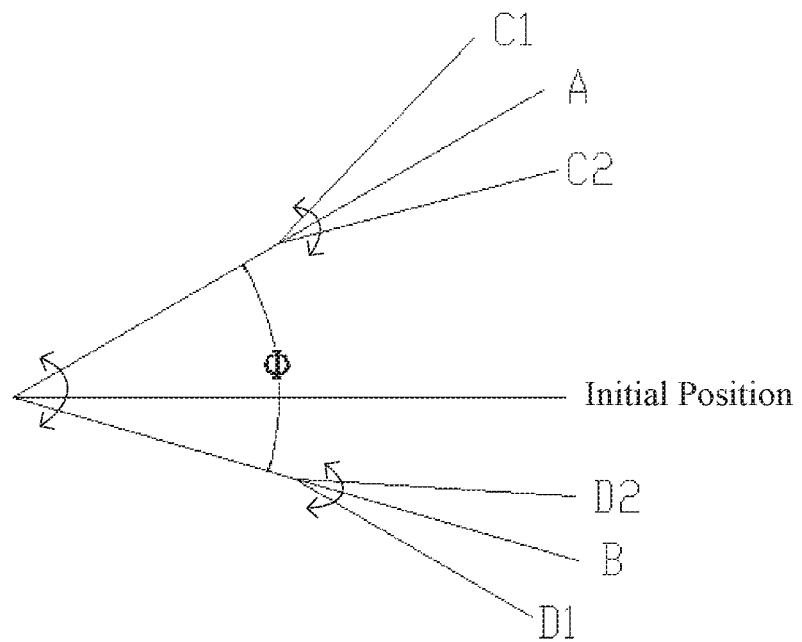
FIG. 11 is a schematic diagram of the adjustable angle range of a pair of augmented reality glasses according to some embodiments of the present disclosure.

FIG. 11 is a schematic diagram of the adjustable angle range of a pair of augmented reality glasses according to some embodiments of the present disclosure. The schematic diagram shows a two-stage rotation adjustment between the main body of glasses 100 and the optical assembly 200, and between the front section 211 and the rear section 212 of the optical assembly 200.

The pair of augmented reality glasses according to some embodiments of the present disclosure adopts a two-stage rotating shaft rotation adjustment which comprise: a first-stage rotating shaft rotation adjustment between the main body of glasses 100 and the optical assembly 200, and a second-stage rotating shaft rotation adjustment between the front section 211 and the rear section 212 of the optical assembly 200. As shown in FIG. 11, when the optical assembly 200 is kept in a straightened state, it is adjusted through a first-stage rotating shaft rotation adjustment, so that the optical element can be freely adjusted between the limit positions indicated by A and B.

In some embodiments, after being adjusted through the first-stage rotating shaft rotation adjustment, it may be further adjusted through the second-stage rotating shaft rotation adjustment to continue to perform another fine adjustment of the augmented reality image position. For example, at the limit position indicated by A, the optical element can be adjusted between the positions indicated by C1 and C2 through the second-stage rotating shaft rotation adjustment. At the limit position indicated by B, the optical element can be adjusted between the positions indicated by D1 and D2 through the second-stage rotating shaft rotation adjustment.

The angle range of the first-stage rotating shaft rotation adjustment is φ. For example, the angle range of adjustment is φ=30° in FIG. 11. Additionally, by means of the second-stage rotating shaft rotation adjustment, the adjustable angle range can be further enlarged, namely, from the original angle range A-B to the angle range C1-D1. Thus, in the wearing process, the user can perform a rough adjustment through the first-stage rotating shaft rotation adjustment, and then perform a slight adjustment through the second-stage rotating shaft rotation adjustment after adjusting to an approximate position, so that the augmented reality image reaches a better position which can meet the requirement of the user.

Sixth Embodiment

Figure 12:
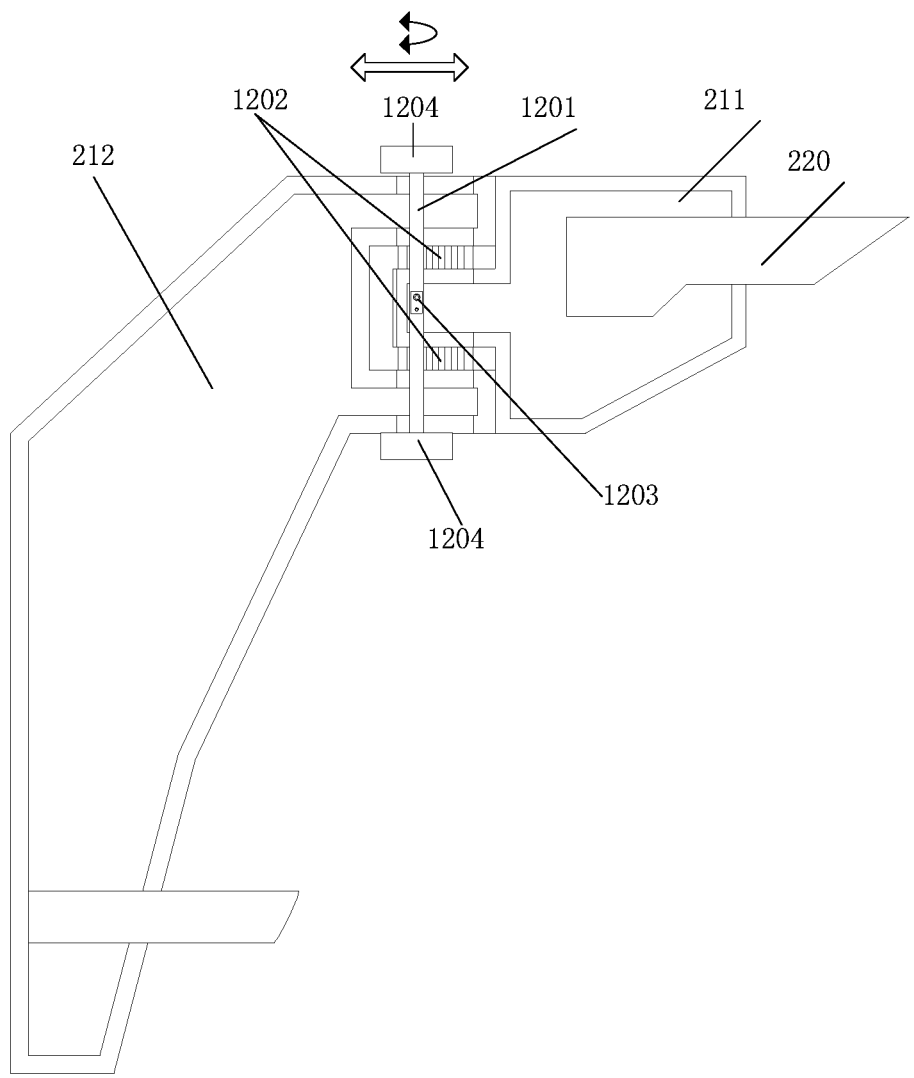
FIG. 12 depicts a structure for connecting a front section and a rear section of the optical assembly shown in some embodiments of the present disclosure.
Figure 13:
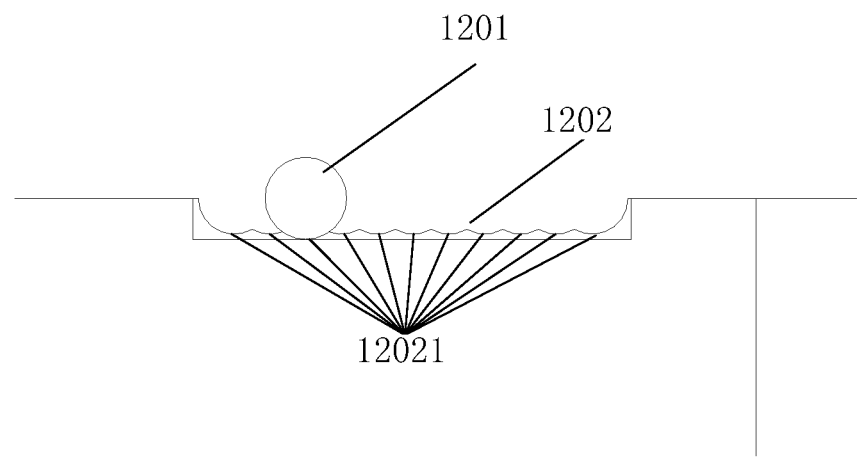
FIG. 13 is a cross sectional view of a silicone sliding groove of FIG. 12.
Figure 14:
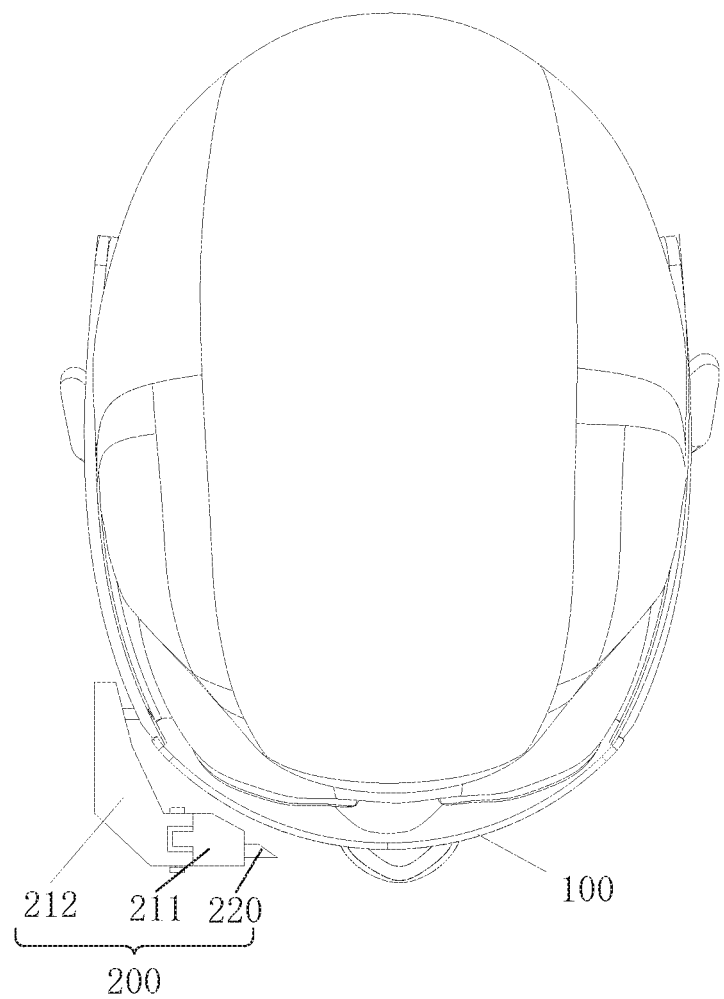
FIG. 14 is a top view of a pair of augmented reality glasses shown in some embodiments of the present disclosure.

FIG. 12 depicts a fourth structure for connecting a front section and a rear section of the optical assembly shown in some embodiments of the present disclosure. FIG. 13 is a cross sectional view of a silicone sliding groove of FIG. 12. FIG. 14 is a top view of a pair of augmented reality glasses shown in the sixth embodiment of the present disclosure.

In some embodiments, the front section 211 and the rear section 212 of the optical assembly 200 cannot only perform a rotation adjustment as shown in FIG. 10, but also perform a sliding adjustment. As shown in FIG. 12 and FIG. 13, the rotating portion between the front section 211 and the rear section 212 comprises a second rotating shaft 1201 and a silicone sliding groove 1202. The second rotating shaft 1201 is fixed on the front section 211 through a screw 1203. The silicone sliding groove 1202 is formed on the rear section 212. The silicone sliding groove 1202 is formed by a plurality of shaft holes 12021 which are communicated. As shown in FIG. 13, in the silicone sliding groove 1202, each arc corresponds to a shaft hole 12021. The second rotating shaft 1201 passes through one of the shaft holes 12021 of the silicone sliding groove 1202, and engages with the shaft hole 12021 with an interference fit. Thereby, the damping rotation connection between the front section 211 and the rear section 212 is realized, so that the front section 211 can rotate with respect to the rear section 212 according to the curved arrow in FIG. 12, and the rotation adjustment of the augmented reality image is realized.

In some embodiments, the second rotating shaft 1201 can slide along the silicone sliding groove 1202 under the action of an external force. It slides into any one of the shaft holes 12021 and engages with the shaft hole 12021 with an interference fit. Thereby, a push-and-pull operation along the direction indicated by the hollow arrow in FIG. 12 can be realized, so that the front section 211 slides with respect to the rear section 212, and the sliding adjustment of the augmented reality image is realized.

In some embodiments, two parallel silicone sliding grooves 1202 are provided. The second rotating shaft 1201 passes through the shaft holes 12021 of the two silicone sliding grooves 1202 which are aligned with each other, and engages with the shaft holes 12021 with an interference fit. By providing two parallel silicone sliding grooves 1202 to engage with the second rotating shaft 1201, the second rotating shaft 1201 can be prevented from swinging, and the stability of rotation adjustment is improved. Of course, the number of the silicone sliding grooves 1202 is not limited thereto, and more silicone sliding grooves may be provided, which is not described in detail herein.

In some embodiments, the silicone sliding groove 1202 and the plastic shell of the rear section 212 are manufactured by a double-material injection process, by which the two materials, namely, silicone and plastic, can be combined firmly, and thus the pair of augmented reality glasses will have a long service life.

As shown in the top view of FIG. 14, in the plane of the paper, the front section 211 may be pushed or pulled in left or right directions of the eyes, to adjust the augmented reality experience. In the direction perpendicular to the paper, the rear section 212 of the optical assembly 200, may be rotated with respect to the main body of glasses 100, and/or the front section 211 of the optical assembly 200, may be rotated with respect to the rear section 212, to adjust the augmented reality experience.

In some embodiments of the present disclosure, the length of the pair of augmented reality glasses is smaller than or equal to 190 mm, the width of the pair of augmented reality glasses is smaller than or equal to 140 mm, and the length of the leg of the pair of augmented reality glasses is smaller than or equal to 160 mm.

In some embodiments of the present disclosure, a mass of the pair of augmented reality glasses is smaller than or equal to 100 g, to meet the light weight requirement of the glasses and improve the wearing comfort.

According to some embodiments of the disclosure, the optical assembly is connected with the outer side of the main body of glasses in a rotational and damped way, so that the position of the augmented reality image can be adjusted by rotating the optical assembly, in order to better adapt to the head size and the eye position of different wearers, and enhance the augmented reality experience of the wearer.

The above description is only some embodiments of the present disclosure. With the teachings of the present disclosure, other improvements or modifications can be made on the basis of the above embodiments by those skilled in the art. Those skilled in the art will understand that the above specific description is only intended to illustrate the present disclosure better, and the protection scope of the present disclosure is subject to the protection scope of the claims.

What is claimed is:

1. A pair of augmented reality glasses comprising a main body of glasses and an optical assembly connected with the main body of glasses, wherein the optical assembly is arranged on an outer side of the main body of glasses, at least one end of the optical assembly is rotationally connected with a leg of the main body of glasses, and the optical assembly rotates with damping with respect to the leg;
   wherein the optical assembly is an L-shaped structure comprising a first component and a second component;
   the first component is connected in a rotational and damped way with the leg, and is arranged along an outer side of the leg;
   the second component comprises an optical element which is arranged along a lens adjacent to the leg;
   wherein the first component further comprises a rotating portion, and the rotating portion divides the first component into a front section and a rear section; the front section is connected with the second component, the rear section is connected in a rotational and damped way with an outer sidewall of the leg, and the front section and the rear section are connected in a rotational and damped way through the rotating portion; and
   wherein in response to the first component rotating with respect to the leg in up and down directions of a user's eyes, a first stage rotation adjustment of the optical assembly with the whole first component as a radius is formed; in response to the front section of the first component rotating with respect to the rear section of the first component in up and down directions of the user's eyes, a second stage rotation adjustment of the optical assembly with the front section of the first component as a radius is formed, and the first stage rotation adjustment of the optical assembly and the second stage rotation adjustment of the optical assembly are in a same plane.

2. The pair of augmented reality glasses according to claim 1, wherein the first component is connected in a rotational and damped way with the leg through a connecting portion, and the connecting portion comprises a first rotating shaft, a first rubber ring, a first pressing gasket, an anti-loose gasket, a second rubber ring and a fastening screw;
   wherein the first rotating shaft is fixed to an outer side of the first component, a shaft hole is formed in the leg, and the first rotating shaft passes through the shaft hole and sequentially passes through the first rubber ring, the first pressing gasket, an anti-loose gasket and a second rubber ring; and
   the fastening screw is screwed into a tail end of the first rotating shaft in its axial direction, and tightly locks the first rubber ring, the first pressing gasket, the anti-loose gasket and the second rubber ring.

3. The pair of augmented reality glasses according to claim 2, wherein the rotating portion comprises a rotating connecting member and a second rotating shaft;
- wherein the second rotating shaft is fixed on the front section;
- the rotating connecting member is sleeved on the second rotating shaft and engages with an interference fit with the second rotating shaft;
- a tail end of the rotating connecting member is fixedly connected with the rear section; and
- a limiting structure is arranged between the second rotating shaft and the rotating connecting member, and the limiting structure restricts the rotating connecting member to rotate around the second rotating shaft in a predetermined range.

4. The pair of augmented reality glasses according to claim 2, wherein the rotating portion comprises: a second rotating shaft, a first rotating shaft component, a second rotating shaft component, a spring, a second pressing gasket and a second butterfly-shaped clamping gasket;
- wherein the first rotating shaft component and the second rotating shaft component are respectively fixed on the rear section and the front section;
- the first rotating shaft component and the second rotating shaft component are both provided with a shaft hole;
- the second rotating shaft passes through the shaft hole of the first rotating shaft component and the shaft hole of the second rotating shaft component, and sequentially passes through the spring, the second pressing gasket and the second butterfly-shaped clamping gasket;
- a second clamping buckle is arranged at a tail end of the second rotating shaft, and the second butterfly-shaped clamping gasket tightly clamps the second clamping buckle to fasten the first rotating shaft component, the second rotating shaft component, the spring and the second pressing gasket; and
- the contacting surface between the first rotating shaft component and the second rotating shaft component is a damping friction surface.

5. The pair of augmented reality glasses according to claim 2, wherein the rotating portion comprises a second rotating shaft and a clamping structure;
- the second rotating shaft is fixed on the rear section, and the clamping structure is fixed on the front section;
- the clamping structure comprises a plurality of clamping claws, and all of the plurality of clamping claws clamp the second rotating shaft, and engage with an interference fit with the second rotating shaft; and
- the second rotating shaft and/or the clamping claws are made of a self-lubricating material.

6. The pair of augmented reality glasses according to claim 2, wherein the rotating portion comprises a second rotating shaft and a silicone sliding groove;
- the second rotating shaft is fixed on the front section, and the silicone sliding groove is formed in the rear section;
- the silicone sliding groove comprises a plurality of shaft holes which are communicated;
- the second rotating shaft passes through one of the shaft holes of the silicone sliding groove, and engages with the shaft hole with an interference fit; and
- the second rotating shaft is capable of sliding along the silicone sliding groove under the action of an external force, and engaging with any one of the shaft holes with an interference fit.

7. The pair of augmented reality glasses according to claim 6, further comprising: two parallel silicone sliding grooves; and
wherein the second rotating shaft passes through shaft holes of the two silicone sliding grooves which are aligned with each other, and engages with the shaft holes with an interference fit.

8. The pair of augmented reality glasses according to claim 1, wherein the first component is connected in a rotational and damped way with the leg through a connecting portion, and the connecting portion comprises a first rotating shaft, a rubber ring and a first butterfly-shaped clamping gasket;
- wherein the first rotating shaft is fixed to an outer side of the first component, a shaft hole is formed in the leg, and the first rotating shaft passes through the shaft hole, and sequentially passes through the rubber ring and the first butterfly-shaped clamping gasket; and
- a first clamping buckle is arranged at a tail end of the first rotating shaft, and the first butterfly-shaped clamping gasket tightly clamps the first clamping buckle and tightly locks the rubber ring.

9. The pair of augmented reality glasses according to claim 8, wherein the rotating portion comprises a rotating connecting member and a second rotating shaft;
- wherein the second rotating shaft is fixed on the front section;
- the rotating connecting member is sleeved on the second rotating shaft and engages with an interference fit with the second rotating shaft;
- a tail end of the rotating connecting member is fixedly connected with the rear section; and
- a limiting structure is arranged between the second rotating shaft and the rotating connecting member, and the limiting structure restricts the rotating connecting member to rotate around the second rotating shaft in a predetermined range.

10. The pair of augmented reality glasses according to claim 8, wherein the rotating portion comprises: a second rotating shaft, a first rotating shaft component, a second rotating shaft component, a spring, a second pressing gasket and a second butterfly-shaped clamping gasket;
- wherein the first rotating shaft component and the second rotating shaft component are respectively fixed on the rear section and the front section;
- the first rotating shaft component and the second rotating shaft component are both provided with a shaft hole;
- the second rotating shaft passes through the shaft hole of the first rotating shaft component and the shaft hole of the second rotating shaft component, and sequentially passes through the spring, the second pressing gasket and the second butterfly-shaped clamping gasket;
- a second clamping buckle is arranged at a tail end of the second rotating shaft, and the second butterfly-shaped clamping gasket tightly clamps the second clamping buckle to fasten the first rotating shaft component, the second rotating shaft component, the spring and the second pressing gasket; and
- the contacting surface between the first rotating shaft component and the second rotating shaft component is a damping friction surface.

11. The pair of augmented reality glasses according to claim 8, wherein the rotating portion comprises a second rotating shaft and a clamping structure;
- wherein the second rotating shaft is fixed on the rear section, and the clamping structure is fixed on the front section;
- the clamping structure comprises a plurality of clamping claws, and all of the plurality of clamping claws clamp the second rotating shaft, and engage with an interference fit with the second rotating shaft; and the second rotating shaft and/or the clamping claws are made of a self-lubricating material.

12. The pair of augmented reality glasses according to claim 8, wherein the rotating portion comprises a second rotating shaft and a silicone sliding groove;

wherein the second rotating shaft is fixed on the front section, and the silicone sliding groove is formed in the rear section;

the silicone sliding groove comprises a plurality of shaft holes which are communicated;

the second rotating shaft passes through one of the shaft holes of the silicone sliding groove, and engages with the shaft hole with an interference fit; and the second rotating shaft is capable of sliding along the silicone sliding groove under the action of an external force, and engaging with any one of the shaft holes with an interference fit.

13. The pair of augmented reality glasses according to claim 12, further comprising: two parallel silicone sliding grooves; and wherein the second rotating shaft passes through shaft holes of the two silicone sliding grooves which are aligned with each other, and engages with the shaft holes with an interference fit.

14. The pair of augmented reality glasses according to claim 1, wherein the length of the pair of augmented reality glasses is smaller than or equal to 190 mm, the width of the pair of augmented reality glasses is smaller than or equal to 140 mm, and the length of the leg is smaller than or equal to 160 mm.

15. The pair of augmented reality glasses according to claim 1, wherein a mass of the pair of augmented reality glasses is smaller than or equal to 100 g.

* * * * *